UNITED STATES PATENT OFFICE.

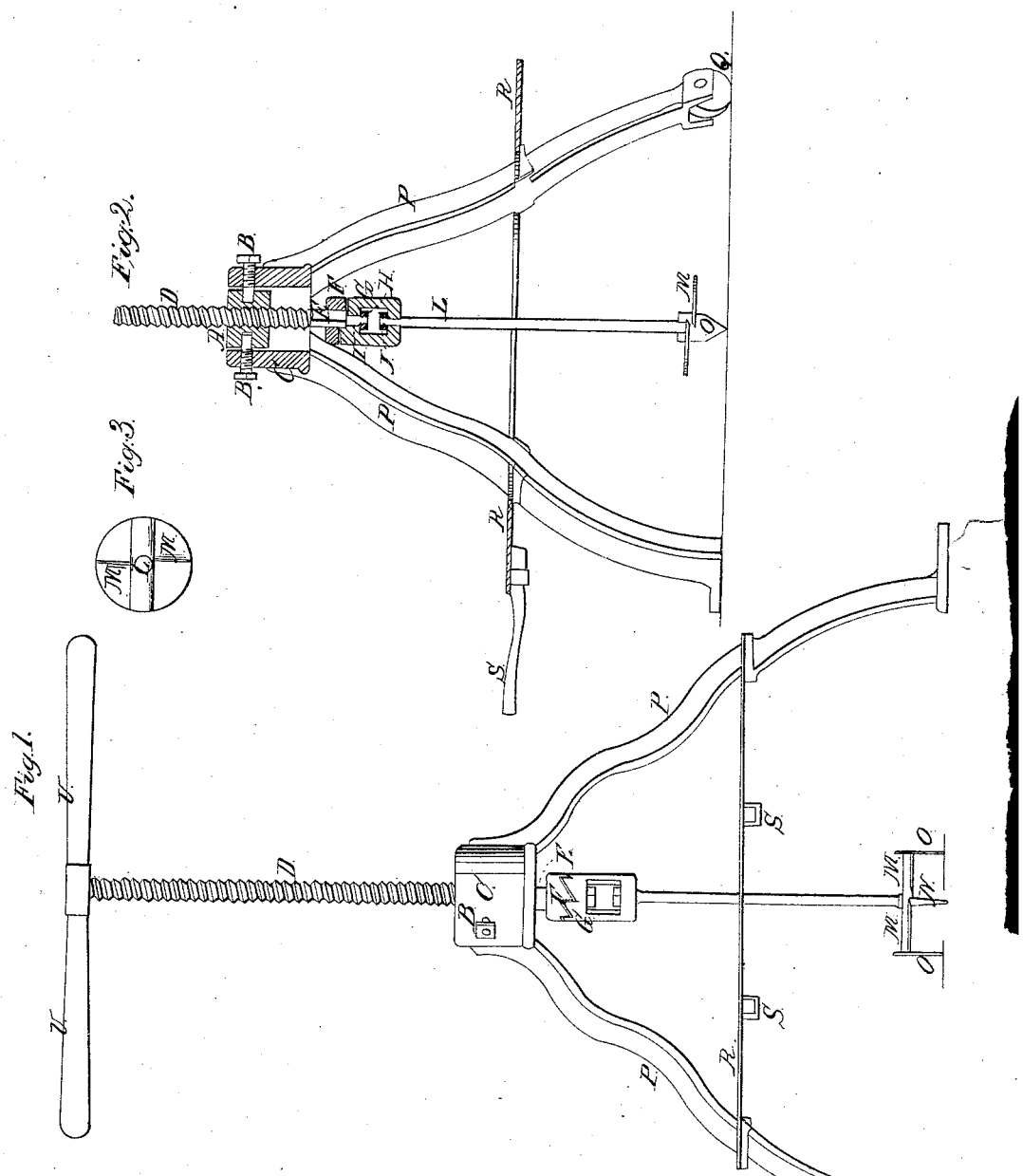

J. G. MANLEY AND F. WEDGE, OF ZANESVILLE, OHIO.

EARTH-BORING MACHINE.

Specification of Letters Patent No. 31,469, dated February 19, 1861.

*To all whom it may concern:*

Be it known that we, J. MANLEY and F. WEDGE, of Zanesville, in the county of Muskingum and State of Ohio, have invented a new and useful Improvement in Earth-Boring Machines; and we do hereby declare that the following is a full, clear, and exact description of the same, reference being had to the accompanying drawings, forming a part of this specification, in which—

Figure 1 represents a front view, and Fig. 2 central vertical section of the machine; Fig. 3, a plan of the auger.

Similar letters of reference, in each of the several figures indicate corresponding parts.

The implement is intended for boring holes into the ground for planting fence posts and similar purposes, and the nature of our invention consists, first, in the arrangement of a screw shaft with a slip coupling in combination with an auger, for the purposes hereinafter to be described; second, in the combination of the screw shaft of an auger with a swinging nut and a frame, as and for the purposes hereinafter to be described.

To enable others, skilled in the art, to make and use our invention, we will proceed to describe its construction and operation.

The implement is supported upon three legs P, P, P, forming a hub C, at the top. A nut A, of smaller diameter than the inner diameter of the hub, is hung inside of said hub upon two pins B, B, screwed through the body of the hub. A long screw shaft D, operated by handles V, at its top, works through said nut A. The cylindrical bottom end I, of the screw shaft passes through a hole in the stirrup G, a nut H, being screwed onto its end. Thus the screw shaft will be allowed to revolve in relation to the stirrup while the stirrup cannot detach itself from the screw shaft. The square end of the shank L, of the auger is inserted into a square hole in the lower part of the stirrup and secured to it by a nut J. Between the cylindrical end I, of the screw shaft and the end of the screw thread D, there is a square portion E, of said screw shaft upon which slides a coupling piece F. The bottom surface of this coupling piece and the top surface of the stirrup are provided with teeth consisting of a vertical and a sloping side. The teeth of the one piece fit into the spaces between the teeth of the other part, as seen in Fig. 1.

The auger consists of horizontal cutters M, M, vertical cutters O, O, and center point N.

A platform R, is arranged around and fastened to the three legs P, of the implement, two handles S, S, being secured to the platform between two of the legs, and a caster wheel Q, to the leg opposite to the handles, as seen in Fig. 2.

The operation is as follows:—The apparatus can easily be transported by taking hold of the two handles S, S, lifting up the two legs, and moving it along upon the caster wheel Q, of the third leg similar to a wheel barrow. When arrived at the place where a hole is to be dug, the apparatus is so placed that the point N, will touch the spot where the hole is to be dug. It will be seen that the apparatus may be placed on sloping ground and yet the screw shaft and auger will—the nut A, being hung on the two pins B, B—assume a perpendicular line and therefore when operated dig a perpendicular hole. As the shaft D, is revolved by means of the handles V, V, the vertical portion of the teeth of the slip coupling takes against the vertical portion of the teeth of the stirrup, and thus the stirrup and the auger fastened to the stirrup are caused to revolve together with the screw shaft. At the same time as the screw shaft works through the nut A, the auger is caused to descend. In this manner the auger digs the hole. When the hole has been dug to the required depth, the handles are revolved in the opposite direction so as to cause the screw shaft to ascend through nut A. But in this direction, the stirrup and auger will not revolve together with the screw shaft because the sloping sides of the coupling F—which latter can freely slide up and down on the square portion E, of the shaft—slip over the teeth of the stirrup. The stirrup and auger will therefore not be revolved during the rise of the screw shaft, but they will rise together with it as the stirrup cannot detach itself from the end of the screw shaft. In this manner, the auger, while rising without revolving will be caused to lift all the loose earth out of the hole and leave the hole clean and ready for the insertion of the post.

The man or men while working the handles, stand on the platform R, so as to bring their weight in addition to that of the machine, to bear upon the auger.

What we claim as our invention and desire to secure by Letters Patent, is—

1. The arrangement of a screw shaft D, with a slip coupling F, G, in combination with an auger M, N, O, substantially as and for the purposes set forth.

2. The combination of a screw shaft D, of an auger M, N, O, with a swinging nut A, and a frame P, C, substantially as and for the purposes set forth.

J. G. MANLEY.
F. WEDGE

Witnesses:
F. A. SEBORN,
S. H. WOOLF.